United States Patent
Ma et al.

(10) Patent No.: US 12,146,700 B2
(45) Date of Patent: Nov. 19, 2024

(54) CONTROL SYSTEM AND CONTROL METHOD OF REFRIGERATOR

(71) Applicants: QINGDAO HAIER REFRIGERATOR CO., LTD., Qingdao (CN); HAIER SMART HOME CO., LTD., Qingdao (CN)

(72) Inventors: Jian Ma, Qingdao (CN); Xiaobing Zhu, Qingdao (CN); Weijie Li, Qingdao (CN); Mengcheng Li, Qingdao (CN); Bin Fei, Qingdao (CN); Peng Liu, Qingdao (CN); Changzhi Wang, Qingdao (CN)

(73) Assignees: QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 0 days.

(21) Appl. No.: 17/916,567

(22) PCT Filed: Feb. 5, 2021

(86) PCT No.: PCT/CN2021/075464
§ 371 (c)(1),
(2) Date: Sep. 30, 2022

(87) PCT Pub. No.: WO2021/196889
PCT Pub. Date: Oct. 7, 2021

(65) Prior Publication Data
US 2024/0085086 A1 Mar. 14, 2024

(30) Foreign Application Priority Data
Mar. 30, 2020 (CN) .......................... 202010234075.1

(51) Int. Cl.
F25D 17/06 (2006.01)
F25D 23/00 (2006.01)
F25D 23/10 (2006.01)

(52) U.S. Cl.
CPC .......... *F25D 17/062* (2013.01); *F25D 23/003* (2013.01); *F25D 23/10* (2013.01); *F25D 2323/0023* (2013.01)

(58) Field of Classification Search
CPC ...... F25D 17/062; F25D 23/003; F25D 23/10; F25D 2323/0023; F25D 2323/00261;
(Continued)

(56) References Cited

U.S. PATENT DOCUMENTS

2016/0069595 A1* 3/2016 Kim .................. F25B 13/00
62/498

FOREIGN PATENT DOCUMENTS

CN 106196847 A 12/2016
CN 106196848 A 12/2016
(Continued)

*Primary Examiner* — Joseph F Trpisovsky
(74) *Attorney, Agent, or Firm* — Cheng-Ju Chiang (57) ABSTRACT

The present invention discloses a control system and a control method of a refrigerator. The control system comprises a collection unit and a fan control unit, and the fan control unit controls a heat dissipation fan to operate at different rotation speeds according to a power-on signal of the refrigerator, a closing signal and an opening signal of the first air port collected by the collection unit. The present invention solves the problem that the hot air discharged out of the compressor compartment blends with cold air and re-enters the compressor compartment, and the problem of poor heat dissipation of the refrigerator when the refrigerator is embedded in the cupboard.

10 Claims, 5 Drawing Sheets

(58) Field of Classification Search
CPC ........... F25D 2323/00271; F25D 29/00; F25D 29/003; F25D 29/005
See application file for complete search history.

(56) References Cited

FOREIGN PATENT DOCUMENTS

| | | | | |
|---|---|---|---|---|
| CN | 110375482 | A | 10/2019 | |
| CN | 110375507 | A | 10/2019 | |
| CN | 209893746 | U | 1/2020 | |
| JP | H8-247620 | A | 9/1996 | |
| KR | 2001-0068977 | A | 7/2001 | |
| KR | 10-2006-0054932 | A | 5/2006 | |
| KR | 20060054931 | A * | 5/2006 | ........... F25D 23/003 |

* cited by examiner

CONTROL SYSTEM AND CONTROL METHOD OF REFRIGERATOR

CROSS REFERENCE TO RELATED APPLICATIONS

This application is a 35 U.S.C. §371 National Phase conversion of International (PCT) Patent Application No. PCT/CN2021/075464, filed on Feb. 5, 2021, which claims priority to Chinese Patent Application No. 202010234075.1, filed on Mar. 30, 2020, the disclosure of which is here incorporated by reference in its entirety. The PCT International Patent Application was filed and published in Chinese.

TECHNICAL FIELD

The present invention relates to the technical field of household electrical appliance, and particularly to a control system and a control method of a refrigerator.

BACKGROUND

With the improvement of living conditions, people are having higher and higher requirements for household environment. A brief and fashionable kitchen appliance decoration concept and intelligent home appeal to people. A refrigerator, as an indispensable kitchen electrical appliance, has a certain volume, and protrudes outwards from the wall when placed in the kitchen or the living room, which does not facilitate reasonable arrangement of the space and pleasant appearance. In view of this, to achieve an integral kitchen electrical appliance decoration style, the refrigerator is usually embedded in the cupboard to make it look like a part of the kitchen or living room.

However, when a conventional refrigerator is mounted, a space of over 100 mm should be reserved around the refrigerator including a rear wall to ensure ventilation and heat dissipation of the compressor compartment, thereby reducing the energy consumption of the refrigerator. Since there is an enough space between the surrounding of the refrigerator and the wall or other articles, the air inlet and air outlet on the back plate of the compressor compartment in the lower rear portion of the refrigerator do not affect each other. When the refrigerator is embedded into the cupboard, the distance between the surrounding of the refrigerator and the cupboard is short, even the rear wall of the refrigerator abuts against the cupboard wall, and the distance between side walls of the refrigerator and the cupboard wall is shorter than 30 mm to reasonably save the space.

As such, after the refrigerator is embedded into the cupboard, the hot air discharged from the compressor compartment is prone to blend with cold air and re-enter the compressor compartment, and the heat dissipation of the refrigerator is affected by the surrounding cupboard wall so that the heat dissipation efficiency is low.

SUMMARY

To at least solve one of the above problems, the present invention provides a control system and a control method of a refrigerator, to solve the problem that the hot air discharged out of the compressor compartment blends with cold air and re-enters the compressor compartment, and the problem of poor heat dissipation of the refrigerator when the refrigerator is embedded in the cupboard.

To achieve one of the above objects, the present invention employs a control system of a refrigerator, the refrigerator comprises a compressor compartment and a shielding member, the compressor compartment comprises a built-in space, a compartment wall enclosing the built-in space, and a heat dissipation fan disposed in the built-in space, the compartment wall is provided with a first air port, a second air port and a third air port, the compartment wall comprises a back plate disposed behind the built-in space, and a bottom plate disposed below the built-in space, the first air port and the second air port are disposed on one of the back plate and the bottom plate, the third air port is disposed on the other of the back plate and the bottom plate, the built-in space has a first air passage and a second air passage, the first air passage communicates with the second air port and the first air port and passes through the heat dissipation fan, and the second air passage communicates with the second air port and the third air port and passes through the heat dissipation fan; when the first air port is opened, both the first air passage and the second air passage form a circulation loop with the external; when the first air port is closed by the shielding member, the second air passage forms a circulation loop with the external;

the control system comprises:
a collection unit configured to collect a power-on signal of the refrigerator and a closing signal and an opening signal of the first air port;
a fan control unit connected to the collection unit, and configured to control the heat dissipation fan to operate at a preset rotation speed $Nf1$ when the collection unit collects the opening signal of the first air port; control the heat dissipation fan to operate at a preset rotation speed $Nf2$ when the collection unit collects the closing signal of the first air port and the power-on signal of the refrigerator; where $Nf2>Nf1$.

In further, the refrigerator further comprises a storage compartment, and the collection unit is further configured to collect temperature of the storage compartment;
the fan control unit is configured to: when the collection unit collects the closing signal of the first air port and the power-on signal of the refrigerator, control the heat dissipation fan to operate at the preset rotation speed $Nf2$, and control the heat dissipation fan to operate at the preset rotation speed $Nf1$ only when the temperature of the storage compartment reaches a preset temperature T.

In further, the shielding member is movably disposed relative to the compartment wall, and the refrigerator further comprises a first conductive end provided on the shielding member and a second conductive end provided on the compartment wall;
when the shielding member opens the first air port, the first conductive end is separated from the second conductive end, and the collecting unit collects the opening signal of the first air port;
when the shielding member closes the first air port, the first conductive end and the second conductive end contact each other, and the collection unit collects the closing signal of the first air port.

In further, the refrigerator further comprises an electric driver, the control system further comprises a drive control unit connected to the electric driver, under the control of the drive control unit, the electric driver is activated to drive the shielding member to close the first air port.

In further, the electric driver comprises an electromagnet and a magnetically conductive block, one of the electromagnet and the magnetically conductive block is disposed on the compartment wall, and the other of the electromagnet and the magnetically conductive block is disposed on the shielding member.

In further, the refrigerator further comprises a sensor that detects position information of the refrigerator and an obstacle, the drive control unit is connected to the sensor, and the drive control unit is configured to control the electric driver to be energized and activated according to the position information.

In further, the refrigerator further comprises a pair of side walls arranged opposite to each other in a left-right direction, the sensor is a distance sensor provided on the side wall, the distance sensor is configured to detect the distance information between the refrigerator and the obstacle, the collection unit collects the distance information between the refrigerator and the obstacle, and the drive control unit controls the electromagnet to be energized to conduct magnetism when the distance between the refrigerator and the obstacle is smaller than a preset distance D.

In further, the control unit is further configured to control the compressor to operate at a preset rotation speed Nc1 when the collecting unit collects the opening signal of the first air port, and control the compressor to operate at a preset rotation speed Nc2 when the collecting unit collects the closing signal of the first air port and the power-on signal of the refrigerator; where Nc2>Nc1.

To achieve the above object, the present invention also provides a control method of a refrigerator, the refrigerator comprises a compressor compartment and a shielding member, the compressor compartment comprises a built-in space, a compartment wall enclosing the built-in space, and a heat dissipation fan disposed in the built-in space, the compartment wall is provided with a first air port, a second air port and a third air port, the built-in space has a first air passage and a second air passage, the first air passage starts from the second air port and is communicated with the first air port via the heat dissipation fan, and the second air passage starts from the second air port and is communicated with the third air port via the heat dissipation fan, the control method comprising the following steps:

when an opening signal of the first air port is collected, and both the first air passage and the second air passage form a circulation loop with the external, controlling the heat dissipation fan in the compressor compartment to operate at a preset rotation speed Nf1;

when a power-on signal of the refrigerator is collected, a closing signal of the first air port is collected, and the second air passage forms a circulation loop with the external, controlling the heat dissipation fan to operate at a preset rotation speed Nf2;

where Nf2>Nf1.

In further, the method further comprises:

collecting a real-time temperature of the storage compartment of the refrigerator;

controlling the heat dissipation fan to operate at the preset rotation speed Nf1 when a temperature of a storage compartment of the refrigerator reaches a preset temperature T.

In further, the method further comprises:

when the power-on signal of the refrigerator is collected, the closing signal of the first air port is collected and the second air passage forms a circulation loop with the external, controlling the heat dissipation fan to operate at the preset rotation speed Nf2, and controlling the heat dissipation fan to operate at the preset rotation speed Nf1 only when a temperature of a storage compartment of the refrigerator reaches a preset temperature T.

As compared with the prior art, the present invention has the following advantageous effects: the problem that the hot air discharged out of the compressor compartment blends with cold air and re-enters the compressor compartment, and the problem of poor heat dissipation of the refrigerator when the refrigerator is embedded in the cupboard are solved by closing the first air port to prevent the hot air discharged out of the compressor compartment from re-entering the compressor compartment, and by collecting the opening signal or closing signal of the first air port to control the rotation speed of the heat dissipation fan to increase.

DETAILED DESCRIPTION

The present invention will be described in detail with reference to embodiments shown in the figures.

In the figures of the present invention, some dimensions of structures or portions might be enlarged relative to other structures or portions to facilitate illustration, and therefore are only intended to illustrate basic structures of the subject matter of the present invention.

It should be appreciated that although terms such as "first" and "second" may be used to describe various elements or structures in the text herein, these described objects should not be limited by these terms. These terms are only used to distinguish these described objects from one another.

Embodiment 1

Figure 1:
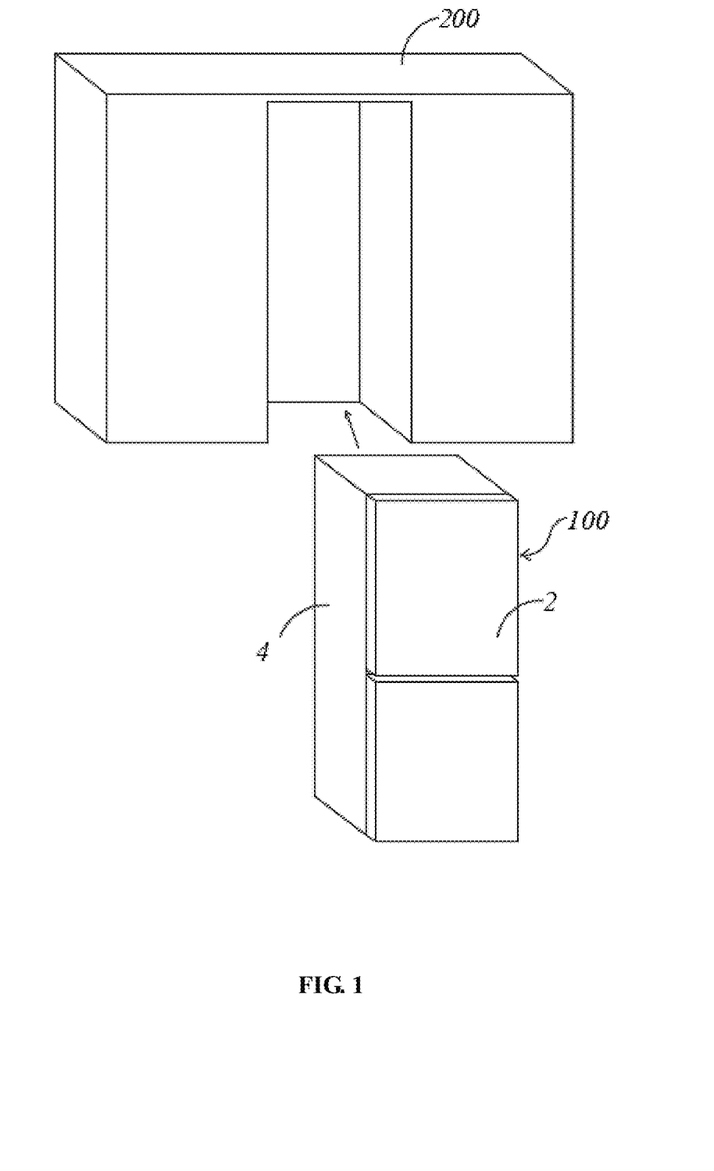
FIG. 1 is a perspective structural schematic view of a refrigerator and a cupboard according to Embodiment 1 of the present invention.
Figure 2:
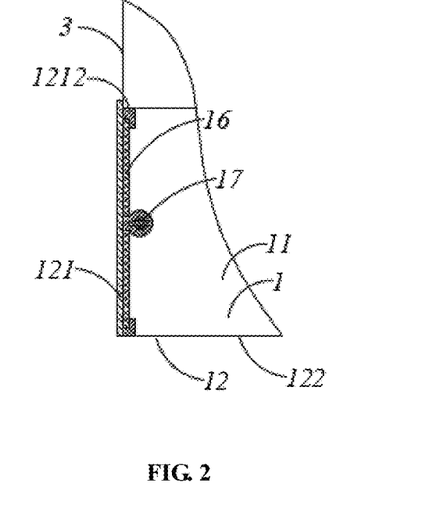
FIG. 2 is a partial cross-sectional view of a compressor compartment according to Embodiment 1 of the present invention.

Referring to FIG. 1 and FIG. 2, a refrigerator 100 according to an embodiment of the present invention comprises a compressor compartment 1 disposed in its lower rear portion, a front wall 2 and a rear wall 3 arranged opposite to each other in a front-rear direction, a pair of side walls 4 arranged opposite to each other in a left-right direction, and a storage compartment. The storage compartment is enclosed by the front wall 2, the rear wall 3 and the pair of side walls 4.

Figure 3:
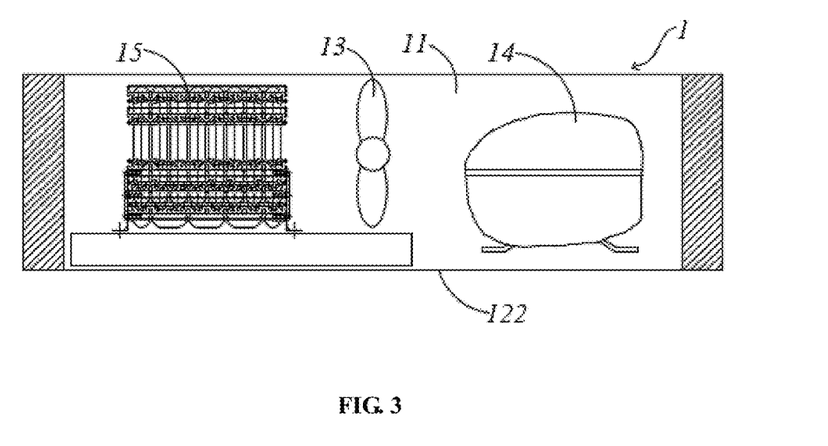
FIG. 3 is a partial cross-sectional view of the compressor compartment according to Embodiment 1 of the present invention as viewed from another angle.

Referring to FIG. 2 and FIG. 3, the compressor compartment 1 comprises a built-in space 11, a compartment wall 12 enclosing the built-in space 11, and a heat dissipation fan 13, a compressor 14 and an evaporator 15 disposed in the built-in space 11. The compartment wall 12 comprises a back plate 121 disposed behind the built-in space 11, and a bottom plate 122 disposed below the built-in space 11.

Figure 4:
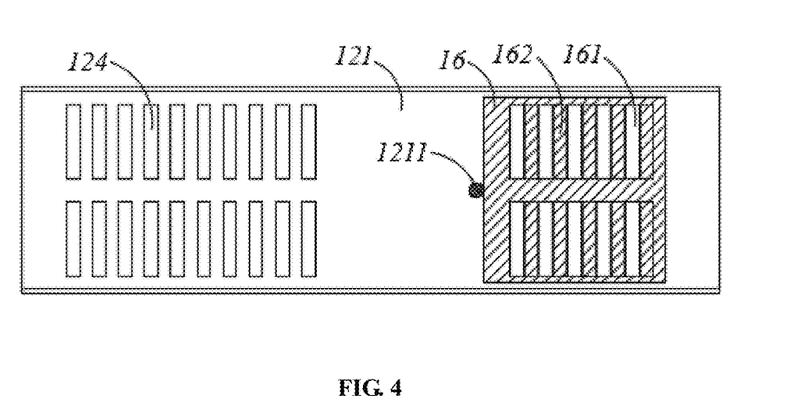
FIG. 4 is a structural schematic view of a back plate of the compressor compartment when a baffle is at a second position according to Embodiment 1 of the present invention.
Figure 4A:
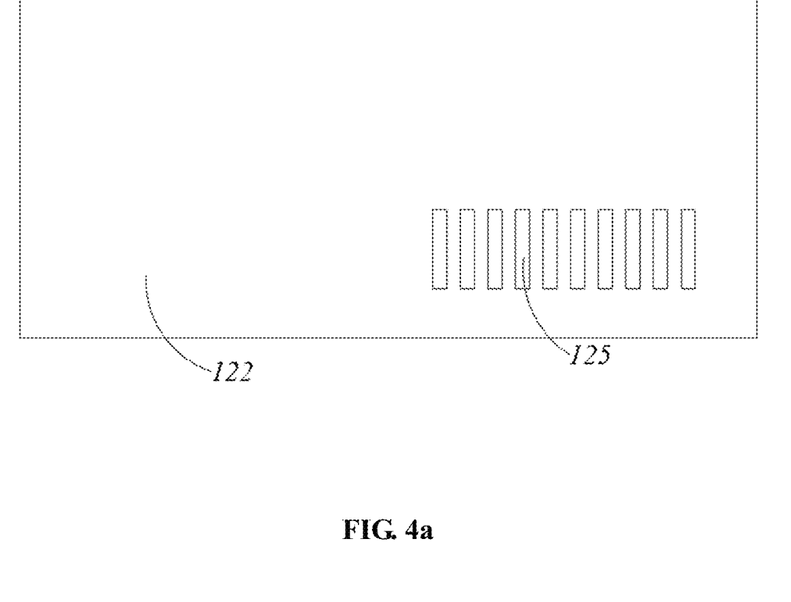
FIG. 4a is a structural schematic view of a bottom plate of the compressor compartment according to Embodiment 1 of the present invention.
Figure 5:
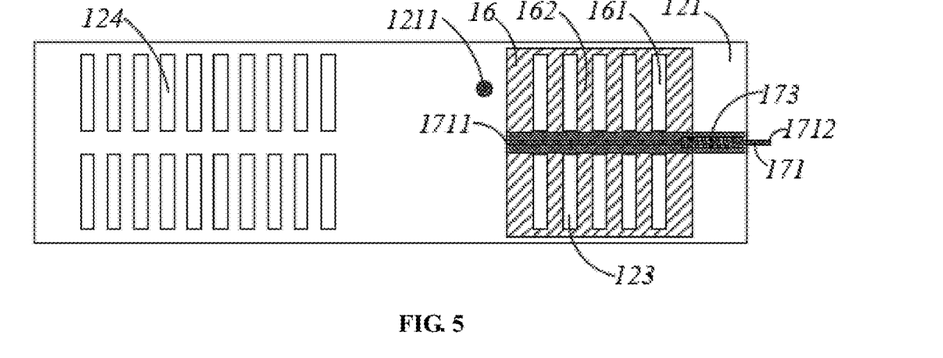
FIG. 5 is a structural schematic view of the back plate of the compressor compartment when the baffle is at a first position according to Embodiment 1 of the present invention.

Referring to FIG. 4 and FIG. 5, the compartment wall 12 is provided with a first air port 123, a second air port 124 and a third air port 125 (Refer to FIG. 4a for details). Specifically, in the present embodiment, the back plate 121 of the compressor compartment 1 has the first air port 123 and the second air port 124 arranged side by side in the left-right direction, and the first air port 123 and the second air port 124 are respectively communicated with a rear space of the refrigerator 100, i.e., communicated with the external to facilitate the compressor compartment 1 to perform air flow exchange with the ambient environment through a rear portion of the compressor compartment 1. The bottom plate 122 of the compressor compartment 1 is provided with the third air port 125 communicated with a lower space of the refrigerator 100, i.e., the third air port 125 is communicated with the external so that the compressor compartment 1 performs air flow exchange with the ambient environment through the bottom of the compressor compartment 1. In other embodiments, the first air port 123 and the second air port 124 may also be disposed on the bottom plate 122, and the third air port 125 is disposed on the back plate.

The first air port 123 may be an air inlet or an air outlet; when the first air port 123 is used as an air inlet, the second air port 124 serves as an air outlet, and the third air port also serves as an air inlet; when the first air port 123 is used as an air outlet, the second air port 124 serves as an air inlet, and the third air port also serves as an air outlet.

With the first air port 123, the second air port 124 and the third air port disposed on the compartment wall 12, the built-in space 11 of the compressor compartment 1 has a first air passage and a second air passage. The first air passage communicates with the first air port 123 and the second air port 124 and passes through the heat dissipation fan 13. And the second air passage communicates with the third air port and the second air port 124 and passes through the heat dissipation fan 13.

For ease of description, in the present embodiment, a reference is taken in which the user faces the rear wall 3 of the refrigerator 100. A direction from the rear wall 3 to the front wall 2 of the refrigerator 100 is taken as a back-to-front direction, that is, the front wall 2 of the refrigerator 100 is located in front of the rear wall 3, and a direction from the second air port 124 to the first air port 123 is taken as a left-to-right direction, that is, the first air port 123 is located on the right side of the second air port 124. Then, one side wall 4 on a side close to the first air port 123 is defined as a right side wall, and the other side wall 4 on a side away from the first air port 123 is defined as a left side wall. In other embodiments, the first air port 123 may also be located on the left side of the second air port 124.

Referring to FIG. 4 to FIG. 5 and FIG. 7 to FIG. 8, the refrigerator 100 further comprises a shielding member for opening or closing the first air outlet 123. When the first air port 123 is opened, both the first air passage and the second air passage form a circulation loop with the external; when the first air port 123 is closed by the shielding member, the second air passage forms a circulation loop with the external.

In the present embodiment, the shielding member employs a baffle 16, which is movably disposed at the first air port 123. The baffle 16 has a first position for opening the first air port 123 and a second position for closing the first air port 123. With the baffle 16 being provided, the baffle 16 may close the first air port 123 on the back plate 121 of the compressor compartment 1 when the refrigerator 100 is embedded in the cupboard 200, so that the compressor compartment 1 employs the second air passage, i.e., air circulates from the third air port on the bottom plate 122 of the compressor compartment 1, via the heat dissipation fan 13 to the second air port 124 on the back plate 121 of the compressor compartment 1. The ingress air and egress air path for heat dissipation in the compressor compartment 1 is changed so that the hot air discharged out of the compressor compartment 1 does not blend with cold air sucked into the compressor compartment 1, thereby achieving efficient heat dissipation of the compressor compartment 1 after the refrigerator 100 is embedded into the cupboard 200, and avoiding the following problems: the blending of cold air and hot air because both the first air port 123 and second air port 124 are located on the back plate 121 of the compressor compartment 1, a higher air temperature in the compressor compartment 1, affect to the performance of the compressor 14 and condenser, and the energy consumption increasing of the refrigerator 100. The above problems are caused when the first air passage which is from the first air port 123 on the back plate 121 of the compressor compartment 1, via the heat dissipation fan 13 to the second air port 124 on the back plate 121 of the compressor compartment 1.

The baffle 16 may be disposed on the inner side of the back plate 121, or may be disposed on the outer side of the back plate 121 according to demands such as aesthetic appeal.

Referring to FIG. 2 and FIG. 5 to FIG. 7, furthermore, the refrigerator 100 further comprises a driving mechanism 17 which drives the baffle 16 to move between the first position and the second position, so that the baffle 16 opens or closes the first air port 123.

Figure 6:
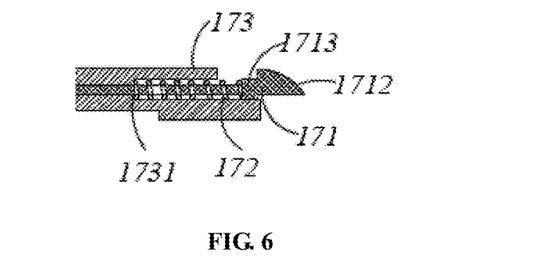
FIG. 6 is a partial cross-sectional view of a push rod according to Embodiment 1 of the present invention.

Referring to FIG. 5 and FIG. 6, further, the driving mechanism 17 is configured as a push rod 171. The push rod 171 moves in a left-right direction relative to the baffle 16 to push the baffle 16 to move from the first position to the second position, i.e., push the baffle 16 to shield the first air port 123 so that the first air port 123 is in a closed state. The push rod 171 has a first end 1711 and a second end 1712 that are arranged opposite to each other in the left-right direction. The first end 1711 is connected to the baffle 16; when the baffle 16 is at the first position, the second end 1712 protrudes out of the side wall 4 of the refrigerator 100 in the left-right direction.

In the present embodiment, the first end 1711 is located at the left end of the push rod 171, and the second end 1712 is located at the right end of the push rod 171. When the baffle 16 is at the first position, the second end 1712 protrudes rightward out of the right side wall 4 of the refrigerator 100 in the left-right direction. In this way, when the refrigerator 100 is embedded in the cupboard 200, the second end 1712 of the push rod 171 interferes with the wall of the cupboard 200. Under the action of the wall of the cupboard 200, the second end 1712 of the push rod 171 receives a force and moves in the left-right direction, and push the baffle 16 to move leftward in the left-right direction to shield the first air port 123, so that the first air port 123 is in the closed state.

In other embodiments, when the first air port 123 is located on the left side of the second air port 124, the first end 1711 is located at the right end of the push rod 171, the second end 1712 is located at the left end of the push rod 171, and the baffle 16 is located at the first position, the second end 1712 protrudes leftward out of the left side wall 4 of the refrigerator 100 in the left-right direction. When the refrigerator 100 is embedded in the cupboard 200, the second end 1712 of the push rod 171 interferes with the wall of the cupboard 200. Under the action of the wall of the cupboard 200, the second end 1712 of the push rod 1712 receives a force and moves rightward in the left-right direction, and push the baffle 16 to move rightward to shield the first air port 123 so that the first air port 123 is in the closed state.

Referring to FIG. 6, further, the end face of the second end 1712 is set as an arcuate surface or an inclined surface gradually away from the side wall 4 from back to front. When the refrigerator 100 is embedded in the cupboard 200, the rear end face of the second end 1712 first resists the wall of the cupboard 200, and then transitions along the arcuate end face to the front end face to resist the wall of the cupboard 200. Under the action of the wall of the cupboard 200, the push rod 171 gradually moves from right to left. As such, the end face of the second end 1712 and the wall of the cupboard 200 move relative to each other in the front-rear direction, which not only saves effort, but also avoids the damage to the wall of the cupboard 200 by the second end 1712.

Referring to FIG. 5 and FIG. 6, furthermore, the driving mechanism 17 further comprises an elastic member 172 connecting the back plate 121 with the push rod 171. The elastic member 172, via the push rod 171, drives the baffle 16 to return from the second position to the first position, and allows the push rod 171 to stably drive the baffle 16 to move in the left-right direction; when the baffle 16 is at the first position, the elastic member 172 has a first deformation amount; when the baffle 16 is at the second position, the elastic member 172 has a second deformation amount; the second deformation amount is greater than the first deformation amount, that is, when the driving mechanism 17 drives the baffle 16 to move from the first position to the second position, the driving mechanism 17 acts on the elastic member 172 to further elastically deform the elastic member 172; when the baffle 16 is at the second position and the external force is removed, the elastic member 172 has an elastic restoration force driving the baffle 16 to return from the second position to the first position, to overcome the elastic deformation of the elastic member 172. In the present embodiment, the elastic member 172 is provided on the right side of the first air port 123.

Referring to FIG. 5 and FIG. 6, to further drive the push rod 171 to move stably in the left-right direction and drive the baffle 16 to move stably in the left-right direction, the back plate 121 is provided with a guide rail 173 extending in the left-right direction. The elastic member 172 is a spring sleeved on an outer circumference of the push rod 171. The push rod 171 and the spring are built into the guide rail 173, the inner wall of the guide rail 173 is provided with a limiting portion 1731, the push rod 171 is provided with a flange 1713, an end of the spring adjacent to the first air port 123, i.e., the left end resists the limiting portion 1731, and the other end of the spring away from the first air port 123, i.e., the right end, resists the flange 1713. The push rod 171 compresses the spring and pushes the baffle 16 to move from the first position to the second position, and the end of the spring adjacent to the first air port 123 is relatively fixed to the back plate 121. When the push rod 171 pushes the baffle 16 to move from the first position to the second position, the flange 1713 of the push rod 171 resists the right end of the spring and compresses and move the spring leftward to elastically deform the spring. In other embodiments, the elastic member 172 may also be in the form of a bellows, a rubber tube, etc., as long as it has elastic deformation.

Referring to FIG. 4 to FIG. 5 and FIG. 7 to FIG. 8, further, a limiting member 1211 is provided on the back plate 121. Specifically, in the present embodiment, the limiting member 1211 is a limiting post. When the baffle 16 is at the first position, the baffle 16 opens the first air port 123, and there is a gap between the baffle 16 and the limiting member 1211; when the baffle 16 is at the second position, the limiting member 1211 resists the baffle 16 and restricts the baffle 16 from moving away from the first position from the second position. The setting of the limiting member 1211 defines a limit position of leftward movement of the baffle 16, and prevents the baffle 16 from moving to stagger with the first air port 123 to fail to completely shield the first air port 123 so that the hot air discharged out of the compressor compartment 1 blends with cold air and enters the compressor compartment 1 again, thereby causing problems such as the increase of the energy consumption of the refrigerator 100 and reduction of the performance of the condenser and the compressor 14.

Furthermore, the refrigerator 100 further comprises a control system comprising a collection unit and a fan control unit. The collection unit is configured to collect a power-on signal of the refrigerator 100 and a closing signal and an opening signal of the first air port 123. The fan control unit is connected to the collection unit, and configured to control the heat dissipation fan 13 to operate at a preset rotation speed Nf1 when the collection unit collects the opening signal of the first air port 123; control the heat dissipation fan 13 to operate at a preset rotation speed Nf2 when the collection unit collects the closing signal of the first air port 123 and the power-on signal of the refrigerator 100; where Nf2>Nf1.

Preferably, Nf2 is 110%~120% times Nf1, and neither Nf1 nor Nf2 exceeds a rated rotation speed of the heat dissipation fan 13.

In this way, when the first air port 123 is closed and the refrigerator 100 is powered on, i.e., when the refrigerator 100 is embedded in the cupboard 200 and powered on, it is possible to, by collecting relevant signals and controlling the rotation speed of the heat dissipation fan 13 to increase, improve a discharge amount and discharge efficiency of hot air as well as the intake amount and air intake efficiency of the cold air, solve the problem of poor heat dissipation caused by the reduction of the number of air ports for air exchange between the compressor compartment 1 and the external, and achieve the automatic control and intelligence of the refrigerator 100.

Furthermore, the collection unit is further configured to collect temperature of the storage compartment; the fan control unit is further configured to: when the collection unit collects the closing signal of the first air port 123 and the power-on signal of the refrigerator 100, control the heat dissipation fan 13 to operate at the preset rotation speed Nf2, and control the heat dissipation fan 13 to operate at the preset rotation speed Nf1 only when the temperature of the storage compartment reaches a preset temperature T.

Figure 8:
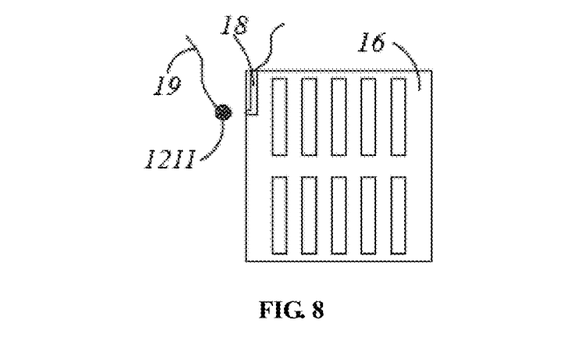
FIG. 8 is a structural schematic view of the baffle and a conductive device according to Embodiment 1 of the present invention.

Referring to FIG. 8, furthermore, the refrigerator 100 further comprises a first conductive end 18 provided on the shielding member and a second conductive end 19 provided on the compartment wall 12. Specifically, in the present embodiment, the first conductive end 18 is provided on the baffle 16, and the second conductive end 19 is provided on the limiting member 1211. When the baffle 16 is at the first position, i.e., when the shielding member opens the first air port 123, the first conductive end 18 is separated from the second conductive end 19, and the collecting unit collects the opening signal of the first air port 123. When the baffle 16 is at the second position, i.e., when the shielding member closes the first air port 123, the first conductive end 18 and the second conductive end 19 contact each other and generate an electrical signal, and the collection unit collects the closing signal of the first air port 123.

In order to make the first conductive end 18 contacts the second conductive end 19 on the limiting post when the baffle 16 is at the second position, the left end of the first conductive end 18 is located at a position of a left edge of the baffle 16 corresponding to the limiting post. The shape of the first conductive end 18 is not limited, as long as the first conductive end 18 does not affect the shielding of the first air port 123 by the baffle 16.

Furthermore, the control unit is further configured to control the compressor 14 to operate at a preset rotation speed Nc1 when the collecting unit collects the opening signal of the first air port 123, and control the compressor 14 to operate at a preset rotation speed Nc2 when the collecting unit collects the closing signal of the first air port 123 and the power-on signal of the refrigerator 100; where Nc2>Nc1. As such, when the first air outlet 123 is closed and the refrigerator 100 is powered on, i.e., when the refrigerator 100 is inserted into the cupboard 200 and turned on, rapid cooling may be achieved so that the refrigerator 100 can quickly reach the preset temperature T.

Preferably, Nc2 is 102% to 110% times Nc1, and none of Nc1 and Nc2 exceeds the rated rotation speed of the compressor 14.

Referring to FIG. 2, furthermore, the back plate 121 is provided with two flanges 1212 opposite to each other up and down. The two flanges 1212 extend in the left-right direction. Upper and lower ends of the baffle 16 are respectively inserted into the grooves of the flanges 1212 to limit the trajectory of the transverse movement of the baffle 16, and the baffle 16 may slide relative to the flanges 1212 in the left-right direction to reciprocate between the first position and the second position. The flanges 1212 are disposed at positions matching the baffle 16. When the baffle 16 is disposed on the inner side of the back plate 121, the flanges 1212 are also correspondingly disposed on the inner side of the back plate 121; when the baffle 16 is disposed on the outer side of the back plate 121, the flanges 1212 are also correspondingly disposed on the outer side of the back plate 121.

Referring to FIG. 4 and FIG. 5, the baffle 16 comprises openings 161 and ribs 162 that are arranged at an interval. When the baffle 16 is at the first position, the openings 161 are aligned with the first air port 123 to open the first air port 123; when the baffle 16 is at the second position, the ribs 162 shield the first air port 123 to close the first air port 123. A width of the gap between the baffle 16 and the limiting member 1211 is the same as the width of the openings 161, so that when the baffle 16 moves to resist the limiting member 1211, the ribs 162 right shield the first air port 123.

Embodiment 2

The difference between Embodiment 2 and Embodiment 1 is as follows:

The driving mechanism 17 is an electric driver. The control system further comprises a drive control unit connected to the electric driver. Under the control of the drive control unit, the electric driver is activated to drive the shielding member to close the first air port 123.

Figure 7:
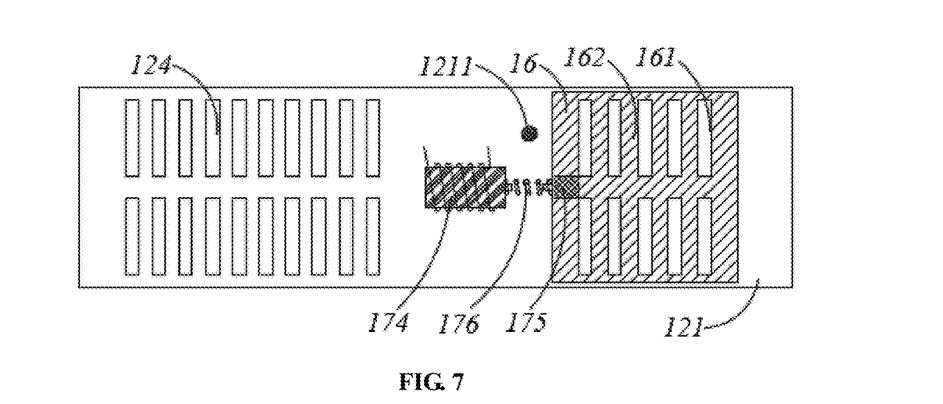
FIG. 7 is a structural schematic view of a back plate of a compressor compartment according to Embodiment 2 of the present invention.

Referring to FIG. 7, the electric driver comprises an electromagnet 174 and a magnetically conductive block 175. One of the electromagnet 174 and the magnetically conductive block 175 is disposed on the back plate 121, and the other of the electromagnet 174 and the magnetically conductive block 175 is disposed on the baffle 16. The electromagnet 174, after being energized, fits with the magnetically conductive block 175 to drive the baffle 16 to move from the first position to the second position. Specifically, in the present embodiment, the electromagnet 174 is disposed on the back plate 121 and the magnetically conductive block 175 is disposed on the baffle 16.

Furthermore, the refrigerator 100 further comprises an elastic return member 176 which drives the baffle 16 to move to return from the second position to the first position to open the first air port 123.

Furthermore, the refrigerator 100 further comprises a sensor that detects position information of the refrigerator 100 and an obstacle. The drive control unit is connected to the sensor, and the drive control unit is configured to control the electric driver to be energized and activated according to the position information so that the electric driver drives the baffle 16 to move from the first position to the second position.

Specifically, in the present embodiment, the sensor is a distance sensor provided on the side wall 4, the distance sensor is configured to detect the distance information between the refrigerator 100 and the obstacle, and the collection unit is connected to the distance sensor and collects the distance information between the refrigerator 100 and the obstacle. When the distance between the refrigerator 100 and the obstacle is shorter than a preset distance D, the drive control unit controls the electromagnet 174 to be energized to conduct magnetism to drive the baffle 16 to move from the first position to the second position.

Except for the above-mentioned differences, other structures of Embodiment 2 and Embodiment 1 are the same, and will not be described in detail any more here.

Embodiment 3

Figure 9:
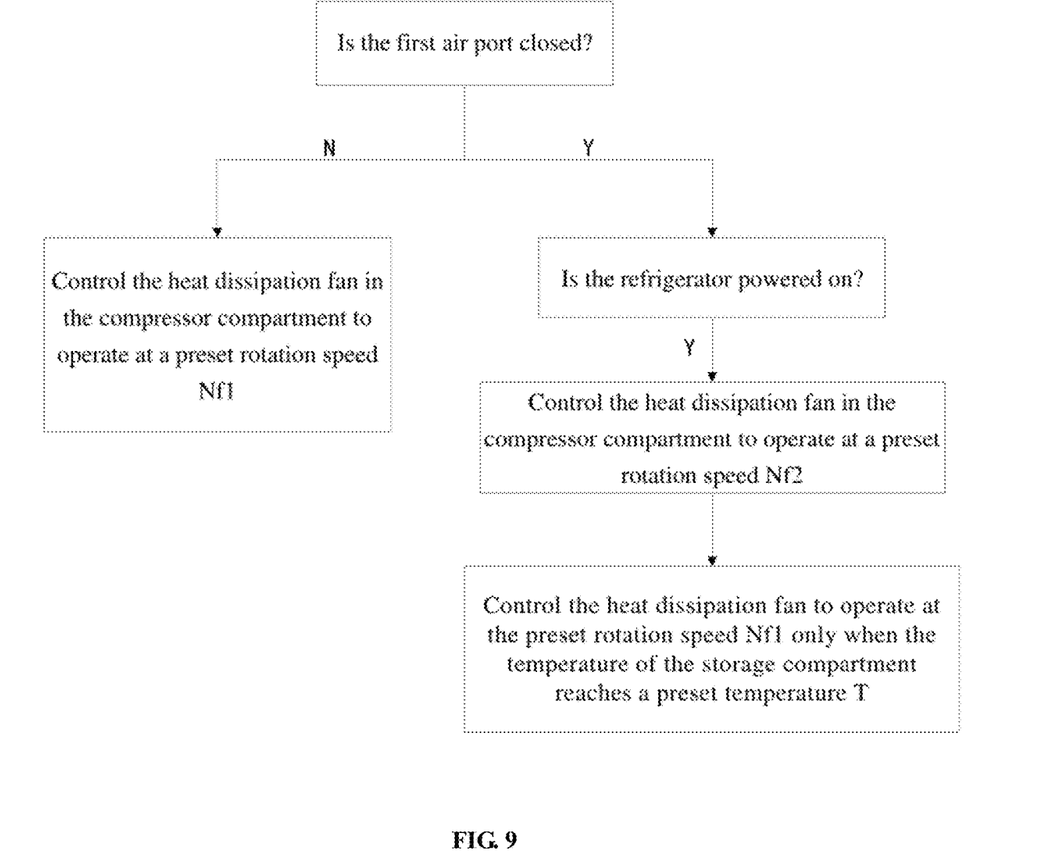
FIG. 9 is a logic flow chart of a control method of a refrigerator according to Embodiment 3 of the present invention.

Referring to FIG. 9, the present invention further provides a method for controlling the refrigerator 100, the method comprising the following steps:
  collecting the power-on signal of the refrigerator 100 and the closing signal of the first air port 123;
  when the opening signal of the first air port 123 is collected, and both the first air passage and the second air passage form a circulation loop with the external, controlling the heat dissipation fan 13 in the compressor compartment 1 to operate at the preset rotation speed Nf1;
  when the power-on signal of the refrigerator 100 is collected, the closing signal of the first air port 123 is collected, and the second air passage forms a circulation loop with the external, controlling the heat dissipation fan 13 to operate at the preset rotation speed Nf2;
  where Nf2>Nf1.

As such, when the refrigerator 100 is powered on and the first air port 123 is closed, i.e., when the refrigerator 100 is embedded in the cupboard 200 and powered on, it is possible to, by increasing the rotation speed of the heat dissipation fan 13, improve a discharge amount and discharge efficiency of hot air as well as the intake amount and air intake efficiency of the cold air, solve the problem of poor heat dissipation caused by the reduction of the number of air ports for air exchange between the compressor compartment 1 and the external, and achieve the automatic control and intelligence of the refrigerator 100.

Furthermore, the method of controlling the refrigerator 100 further comprises the following steps:

When the power-on signal of the refrigerator 100 is collected, the closing signal of the first air port 123 is collected and the second air passage forms a circulation loop with the external, controlling the heat dissipation fan 13 to operate at the preset rotation speed Nf2, and controlling the heat dissipation fan 13 to operate at the preset rotation speed Nf1 only when the temperature of the storage compartment of the refrigerator 100 reaches the preset temperature T.

When the temperature of the storage compartment reaches the preset temperature of the refrigerator 100, the heat dissipation fan 13 operates at a normal rotation speed to achieve normal heat dissipation of the compressor compartment 1.

In order to illustrate the effect of the refrigerator 100 in addressing the problem of blending of hot air and cold air in the compressor compartment, simulation is performed as follows for the heat dissipation of the compressor compartment of the refrigerator, with the ambient temperature being 32° C.

Control group 1: simulation is performed for an ordinary refrigerator when it is not embedded in the cupboard: the distance between the left side wall of the refrigerator and the obstacle is set to 100 mm, and the distance between the right side wall of the refrigerator and the obstacle is aiso set to 100 mm, wherein the first air port and the second air port are provided on the back plate of the compressor compartment, the third air port is provided on the bottom plate of the compressor compartment, and the first air port, the second air port and the third air port are all in the open state.

Control group 2: simulation is performed when an ordinary refrigerator is embedded in the cupboard: the distance between the left side wall of the refrigerator and the obstacle is set to 3 mm, and the distance between the right side wall of the refrigerator and the obstacle is also set to 3 mm, wherein the first air port and the second air port are provided on the back plate of the compressor compartment, the third air port is provided on the bottom plate of the compressor compartment, and the first air port, the second air port and the third air port are all in the open state.

Experimental group: simulation is performed when the refrigerator of the present embodiment is embedded in the cupboard: the distance between the left side wall of the refrigerator and the obstacle is set to 3 mm, and the distance between the right side wall of the refrigerator and the obstacle is also set to 3 mm, wherein the first air port and the second air port are provided on the back plate of the compressor compartment, the third air port is provided on the bottom plate of the compressor compartment, and the first air port is in the closed state, and the second air port and the third air port are both in the open state.

Simulation and analysis results of the effective air amounts, average temperatures of ingress air and average temperatures of the condensers of the three sets of refrigerators listed in the following table are obtained by performing simulation and analysis for the above three sets of refrigerators:

| Index | Control group 1 | Control group 2 | Experimental group |
| --- | --- | --- | --- |
| Effective air amount (L/min) | 1513 | 1120 | 1379 |
| Average temperature of ingress air (° C.) | 32.5 | 36.9 | 32.7 |
| Average temperature of the condenser (° C.) | 41.9 | 45.7 | 42.1 |

As known from the above simulation and analysis data, when the ordinary refrigerator is embedded into the cupboard, since the hot air discharged out of the air port on the back plate of the compressor compartment blends with cold air and re-enters the compressor compartment, the average temperature of the ingress air in the compressor compartment rises, the effective air amount reduces, and the temperature of the condenser increases significantly; as compared with the ordinary refrigerator, when the refrigerator of the present embodiment is embedded in the cupboard, it is possible to, by shielding the first air port, effectively prevent the hot air discharged out of the compressor compartment from blending with cold air and re-entering the compressor compartment, increase the amount of effective air entering the compressor compartment, reduces the average temperature of the ingress air in the compressor compartment and the average temperature of the condenser, and achieves an effect approximate to a normal refrigerator when not embedded in the cupboard.

In other words, in the refrigerator 100 of the present embodiment, the ingress air and egress air path for heat dissipation in the compressor compartment 1 is changed so that the hot air discharged out of the compressor compartment 1 does not blend with cold air sucked into the compressor compartment 1, thereby avoiding the following problems: the blending of cold air and hot air caused by the first air port 123 and the second air port 124 located on the back plate 121 of the compressor compartment 1, the high temperature of the ingress air in the compressor compartment 1, reduction of the performance of the compressor 14 and the condenser, and the increase of the energy consumption of the refrigerator 100.

As compared with the prior art, the refrigerator 100, the controlling system of the refrigerator 100 and the controlling method of the refrigerator 100 according to the present invention have the following advantageous effects: in the refrigerator 100 according to the present invention, the ingress air and egress air path for heat dissipation in the compressor compartment 1 is changed so that the hot air discharged out of the compressor compartment 1 does not blend with cold air sucked into the compressor compartment 1, thereby achieving the efficient heat dissipation of the compressor compartment 1 after the refrigerator 100 is embedded in the cupboard 200; the drive mechanism 17 is provided to drive the baffle 16 to open or close the first air port 123; the second end 1712 of the push rod 171 protrudes out of the side wall 4 of the refrigerator 100 in the left-right direction, so that the baffle 16 can automatically close the first air port 123 by virtue of the action of the cupboard 200 when the refrigerator 100 is embedded in the cupboard 200; the return and stability of the push rod 171 is achieved by the spring; the guidance and stabilization of the push rod 171 is achieved through the guide rail 173; the baffle 16 may be automatically controlled to close the first air port 123 through the cooperation of the electromagnet 174 and the magnetically conductive block 175; the return of the magnetically conductive block 175 may be achieved through the return spring 176; with the first conductive end 18 and second conductive end 19 being disposed on the baffle 16 and back plate 121, when the baffle 16 moves to close the first air port 123, an electrical signal is generated; the cooperation of the baffle 16 and the first air port 123 may be achieved by providing the limiting member 1211 on the back plate 121, so that the baffle 16 exactly shields the first air port 123; it is possible to, by providing the control system to collect relevant signals of the refrigerator 100 and control the rotation speed of the heat dissipation fan 13 to increase, improve a discharge amount and discharge efficiency of hot air as well as the intake amount and air intake efficiency of the cold air, solve the problem of poor heat dissipation caused by the reduction of the number of air ports for air exchange between the compressor compartment 1 and the external, and achieve the automatic control and intelligence of the refrigerator 100; the intelligentization of the refrigerator 100 is achieved by providing the sensor to detect the position information of the refrigerator 100 and the obstacle to judge whether the refrigerator 100 is embedded in the cupboard 200; in addition, according to the controlling method of the refrigerator 100, the intelligentization degree of the refrigerator 100 is substantially improved by collecting the power-on signal of the refrigerator 100 and the opening signal and closing signal of the first air port 123 to control the rotation speed of the heat dissipation fan 13 to change. The simulation tests further prove that the refrigerator according to embodiments, when embedded in the cupboard, may effectively prevent the hot air discharged out of the compressor compartment from blending with cold air and re-entering the compressor compartment, increase the amount of effective air entering the compressor compartment, and reduces the average temperature of the ingress air in the compressor compartment and the average temperature of the condenser.

It should be understood that although the description is described according to the embodiments, not every embodiment only comprises one independent technical solution, that such a description manner is only for the sake of clarity, that those skilled in the art should take the description as an integral part, and that the technical solutions in the embodiments may be suitably combined to form other embodiments understandable by those skilled in the art.

The detailed descriptions set forth above are merely specific illustrations of feasible embodiments of the present invention, and are not intended to limit the scope of protection of the present invention. All equivalent embodiments or modifications that do not depart from the art spirit of the present invention should fall within the scope of protection of the present invention.

What is claimed is:

1. A control system of a refrigerator, wherein the refrigerator comprises a compressor compartment and a shielding member, the compressor compartment comprises a built-in space, a compartment wall enclosing the built-in space, and a heat dissipation fan disposed in the built-in space, the compartment wall is provided with a first air port, a second air port and a third air port, the compartment wall comprises a back plate disposed behind the built-in space, and a bottom plate disposed below the built-in space, the first air port and the second air port are disposed on one of the back plate and the bottom plate, the third air port is disposed on the other of the back plate and the bottom plate, the built-in space has a first air passage and a second air passage, the first air passage communicates with the second air port and the first air port and passes through the heat dissipation fan, and the second air passage communicates with the second air port and the third air port and passes through the heat dissipation fan; when the first air port is opened, both the first air passage and the second air passage form a circulation loop with the external; when the first air port is closed by the shielding member, the second air passage forms a circulation loop with the external;

the control system comprises:
a collection unit configured to collect a power-on signal of the refrigerator and a closing signal and an opening signal of the first air port;
a fan control unit connected to the collection unit, and configured to control the heat dissipation fan to operate at a preset rotation speed Nf1 when the collection unit collects the opening signal of the first air port; control the heat dissipation fan to operate at a preset rotation speed Nf2 when the collection unit collects the closing signal of the first air port and the power-on signal of the refrigerator; where Nf2>Nf1.

2. The control system of a refrigerator according to claim 1, wherein the refrigerator further comprises a storage compartment, and the collection unit is further configured to collect temperature of the storage compartment;
the fan control unit is configured to: when the collection unit collects the closing signal of the first air port and the power-on signal of the refrigerator, control the heat dissipation fan to operate at the preset rotation speed Nf2, and control the heat dissipation fan to operate at the preset rotation speed Nf1 only when the temperature of the storage compartment reaches a preset temperature T.

3. The control system of a refrigerator according to claim 1, wherein the shielding member is movably disposed relative to the compartment wall, and the refrigerator further comprises a first conductive end provided on the shielding member and a second conductive end provided on the compartment wall;
when the shielding member opens the first air port, the first conductive end is separated from the second conductive end, and the collecting unit collects the opening signal of the first air port;
when the shielding member closes the first air port, the first conductive end and the second conductive end contact each other, and the collection unit collects the closing signal of the first air port.

4. The control system of a refrigerator according to claim 1, wherein the refrigerator further comprises an electric driver, the control system further comprises a drive control unit connected to the electric driver, under the control of the drive control unit, the electric driver is activated to drive the shielding member to close the first air port.

5. The control system of a refrigerator according to claim 4, wherein the electric driver comprises an electromagnet and a magnetically conductive block, one of the electromagnet and the magnetically conductive block is disposed on the compartment wall, and the other of the electromagnet and the magnetically conductive block is disposed on the shielding member.

6. The control system of a refrigerator according to claim 4, wherein the refrigerator further comprises a sensor that detects position information of the refrigerator and an obstacle, the drive control unit is connected to the sensor, and the drive control unit is configured to control the electric driver to be energized and activated according to the position information.

7. The control system of a refrigerator according to claim 6, wherein the refrigerator further comprises a pair of side walls arranged opposite to each other in a left-right direction, the sensor is a distance sensor provided on the side wall, the distance sensor is configured to detect the distance information between the refrigerator and the obstacle, the collection unit collects the distance information between the refrigerator and the obstacle, and the drive control unit controls the electromagnet to be energized to conduct magnetism when the distance between the refrigerator and the obstacle is smaller than a preset distance D.

8. The control system of a refrigerator according to claim 2, wherein the control unit is further configured to control the compressor to operate at a preset rotation speed Nc1 when the collecting unit collects the opening signal of the first air port, and control the compressor to operate at a preset rotation speed Nc2 when the collecting unit collects the closing signal of the first air port and the power-on signal of the refrigerator; where Nc2>Nc1.

9. A control method of a refrigerator, wherein the refrigerator comprises a compressor compartment and a shielding member, the compressor compartment comprises a built-in space, a compartment wall enclosing the built-in space, and a heat dissipation fan disposed in the built-in space, the compartment wall is provided with a first air port, a second air port and a third air port, the built-in space has a first air passage and a second air passage, the first air passage starts from the second air port and is communicated with the first air port via the heat dissipation fan, and the second air passage starts from the second air port and is communicated with the third air port via the heat dissipation fan, the control method comprising the following steps:
  when an opening signal of the first air port is collected, and both the first air passage and the second air passage form a circulation loop with the external, controlling the heat dissipation fan in the compressor compartment to operate at a preset rotation speed Nf1;
  when a power-on signal of the refrigerator is collected, a closing signal of the first air port is collected, and the second air passage forms a circulation loop with the external, controlling the heat dissipation fan to operate at a preset rotation speed Nf2;
  where Nf2>Nf1.

10. The control method of a refrigerator according to claim 9, wherein the method further comprises:
  when the power-on signal of the refrigerator is collected, the closing signal of the first air port is collected and the second air passage forms a circulation loop with the external, controlling the heat dissipation fan to operate at the preset rotation speed Nf2, and controlling the heat dissipation fan to operate at the preset rotation speed Nf1 only when a temperature of a storage compartment of the refrigerator reaches a preset temperature T.

* * * * *